US010131104B2

(12) United States Patent
Takizawa et al.

(10) Patent No.: US 10,131,104 B2
(45) Date of Patent: Nov. 20, 2018

(54) VULCANIZATION CONTROL METHOD AND VULCANIZATION CONTROL SYSTEM

(71) Applicant: The Yokohama Rubber Co., LTD., Minato-ku, Tokyo (JP)

(72) Inventors: Hiroshi Takizawa, Hiratsuka (JP); Hajime Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 323 days.

(21) Appl. No.: 14/893,318

(22) PCT Filed: May 27, 2014

(86) PCT No.: PCT/JP2014/063966
§ 371 (c)(1),
(2) Date: Nov. 23, 2015

(87) PCT Pub. No.: WO2014/192742
PCT Pub. Date: Dec. 4, 2014

(65) Prior Publication Data
US 2016/0082681 A1 Mar. 24, 2016

(30) Foreign Application Priority Data
May 27, 2013 (JP) .................................. 2013-110675

(51) Int. Cl.
*B29D 30/06* (2006.01)
*B29C 35/02* (2006.01)
(Continued)

(52) U.S. Cl.
CPC ...... *B29D 30/0662* (2013.01); *B29C 35/0288* (2013.01); *G05B 13/04* (2013.01);
(Continued)

(58) Field of Classification Search
CPC ........ B29D 30/0662; B29D 2030/0675; B29D 2030/0665; G05B 13/04; B29C 35/0288; B29K 2021/00; B29L 2030/00
See application file for complete search history.

(56) References Cited

U.S. PATENT DOCUMENTS
2001/0031836 A1 10/2001 Datta et al.

FOREIGN PATENT DOCUMENTS
CN 1057424 1/1992
CN 101360983 2/2009
(Continued)

OTHER PUBLICATIONS

International Search Report for International Application No. PCT/JP2014/063966 dated Sep. 2, 2014, 2 pages, Japan.

*Primary Examiner* — Kyoung Lee
(74) *Attorney, Agent, or Firm* — Thorpe North & Western

(57) ABSTRACT

A vulcanization control method and a vulcanization control system are provided that are capable of preventing insufficient vulcanization while shortening a vulcanization time and obtaining an optimal vulcanization time instantly, even when a simple analysis model is used. Data (Xi) of predetermined types of vulcanization-affecting factors (X) are input into a computation device (2) by an input device (6) before vulcanizing a green tire (G). Using the input data (Xi), a change in temperature distribution of a tire cross section over time is calculated with a one-dimensional thermal conduction model for a tire cross-section that passes through a vulcanization rate-limiting section. On the basis of the calculation results, a vulcanization time Tc is instantly calculated. Upon calculating the vulcanization time Tc, a safety time Ts set on the basis of each vulcanization-effecting factor (X) is shortened on the basis of the input data (Xi) of the individual vulcanization-affecting factors (X).

19 Claims, 3 Drawing Sheets

(51) Int. Cl.
*G05B 13/04* (2006.01)
*B29L 30/00* (2006.01)
*B29K 21/00* (2006.01)

(52) U.S. Cl.
CPC ............ *B29D 2030/0665* (2013.01); *B29D 2030/0675* (2013.01); *B29K 2021/00* (2013.01); *B29L 2030/00* (2013.01)

(56) References Cited

FOREIGN PATENT DOCUMENTS

| | | |
|---|---|---|
| JP | 2003/526723 | 9/2003 |
| JP | 2007/098756 | 4/2007 |
| JP | 2011/184512 | 9/2011 |
| WO | WO 2001/68761 | 9/2001 |
| WO | WO 2007/083498 | 7/2007 |

VULCANIZATION CONTROL METHOD AND VULCANIZATION CONTROL SYSTEM

TECHNICAL FIELD

The present technology relates to a vulcanization control method and a vulcanization control system, and more particularly relates to a vulcanization control method and a vulcanization control system that are capable of preventing insufficient vulcanization while shortening vulcanization time and obtaining the optimal vulcanization time instantly, even when a simple analysis model is used.

BACKGROUND

When manufacturing a tire, a green tire formed of unvulcanized rubber is vulcanized for a predetermined period of time. Generally, the vulcanization time is determined taking a blow point time of the unvulcanized rubber (the rubber composition) as reference. The blow point time is a minimum time required for air bubbles to no longer be generated in the interior portion of the rubber composition when the rubber composition that is being vulcanized under pressure is removed from the molding die and is returned to atmospheric pressure in order to end the vulcanization step. Various variations occur in the molding step and the vulcanization step, and these variations are therefore taken into account in the vulcanization time. Taking a degree of equivalent vulcanization that corresponds to a blow point time of the unvulcanized rubber in the vulcanization rate-limiting section of the tire as reference, a blow point time of the tire required to reach the vulcanization time is established, a predetermined safety time is added and the vulcanization time is set to prevent insufficient vulcanization. On the other hand, if the vulcanization time becomes longer, productivity deteriorates and there may also be an adverse impact on the physical properties of the rubber due to over-vulcanization. There is therefore a demand to shorten the vulcanization time as much as possible, while preventing insufficient vulcanization.

For example, a control system has been proposed in which an optimum vulcanization time is obtained in advance for each individual tire, and control is performed to carry out vulcanization for this optimum vulcanization time, thus eliminating a deterioration in tire performance due to over-vulcanization, and uniform tires are obtained with a high level of efficiency (see Japanese Unexamined Patent Application Publication No. 2007-98756A). Specifically, in the control system described in Japanese Unexamined Patent Application Publication No. 2007-98756A, a reference vulcanization time is calculated in advance on the basis of reference values of a plurality of characteristic values that affect the vulcanization time. Then, for each individual tire to be vulcanized, measurement results obtained by measuring each of the characteristic values are compared with the respective reference values and a difference therebetween is calculated. A reference vulcanization time is corrected using a vulcanization time corresponding to the difference, and thus the vulcanization time when the vulcanization is actually carried out is calculated. However, in order to perform the correction and calculate the vulcanization time, it is necessary to ascertain, through experiments and FEM calculations, a degree of impact of each of the characteristic values on the vulcanization time. What is more, as it is necessary to ascertain the degree of impact for each different tire specification, a great amount of operation man-hours is required, and it is necessary to create a large scale database.

Further, in order to ascertain a state of heat conduction in the tire vulcanization step, a three-dimensional thermal conduction/vulcanization reaction rate analysis model is also used. However, a high level of technology and a great amount of time are required to create the three-dimensional analysis model. Further, as a great amount of time is required to perform the calculations at the time of analysis, there is a problem that is it not possible to instantly obtain the optimum vulcanization time.

SUMMARY

The present technology provides a vulcanization control method and a vulcanization control system that are capable of preventing insufficient vulcanization while shortening vulcanization time and obtaining the optimal vulcanization time instantly, even when a simple analysis model is used.

A vulcanization control method of the present technology to achieve the above-described object calculates a vulcanization time including a safety time set on the basis of vulcanization-affecting factors that affect the vulcanization time, and vulcanizes a green tire for the calculated vulcanization time. The method includes the steps of inputting data of predetermined types of vulcanization-affecting factors into a computation device before vulcanizing a green tire; calculating, by the computation device that uses the input data, a change in temperature distribution of a tire cross section over time with a one-dimensional thermal conduction model for a tire cross section that passes through a vulcanization rate-limiting section of the green tire; instantly calculating a vulcanization time on the basis of the calculation results. In such a method, upon calculating the vulcanization time, the safety time set on the basis of each vulcanization-affecting factor is shortened on the basis of the input data of the individual vulcanization-affecting factors.

A vulcanization control system of the present technology is provided with a computation device that calculates a vulcanization time including a safety time set on the basis of vulcanization-affecting factors that affect the vulcanization time, and the vulcanization control system vulcanizes a green tire for the calculated vulcanization time. A one-dimensional thermal conduction model for a tire cross-section that passes through a vulcanization rate-limiting section of a green tire to be vulcanized is stored in advance in the computation device, and an input device is provided that inputs data of predetermined types of vulcanization-affecting factors into the computation device before vulcanizing the green tire. The computation device uses the data input by the input device to calculate a change in temperature distribution of a tire cross section over time with the one-dimensional thermal conduction model and to instantly calculate a vulcanization time on the basis of the calculation results. Upon calculating the vulcanization time, the computation device shortens the safety time set on the basis of each vulcanization-affecting factor, on the basis of the data of the individual vulcanization-affecting factors input by the input device.

According to the present technology, as a simple one-dimensional thermal conduction model is used as an analysis model to calculate the vulcanization time, it is possible to reduce a number of man-hours required to create the analysis model, and calculations required for the analysis are also completed in a short time. Moreover, heat applied to the green tire by the vulcanization has a simple movement in which the heat is conducted from high temperature sections to low temperature sections, and, rather than an instant quantity of heat, an accumulation of a chemical reaction based on the applied quantity of heat has a large impact on the vulcanization time. Therefore, even without using a complex analysis model such as a three-dimensional FEM model, it is possible to instantly and accurately calculate the optimum vulcanization time with the one-dimensional thermal conduction model that passes through the vulcanization rate-limiting section. Further, when calculating the vulcanization time, a safety time set on the basis of respective vulcanization-affecting factors is shortened on the basis of input individual vulcanization-affecting factors, for example, by causing the safety time to be proportional to the weight of the factors in terms of their distribution, and it is therefore possible to logically shorten the vulcanization time while preventing insufficient vulcanization.

BRIEF DESCRIPTION OF THE DRAWING(S)

DETAILED DESCRIPTION

Figure 1:
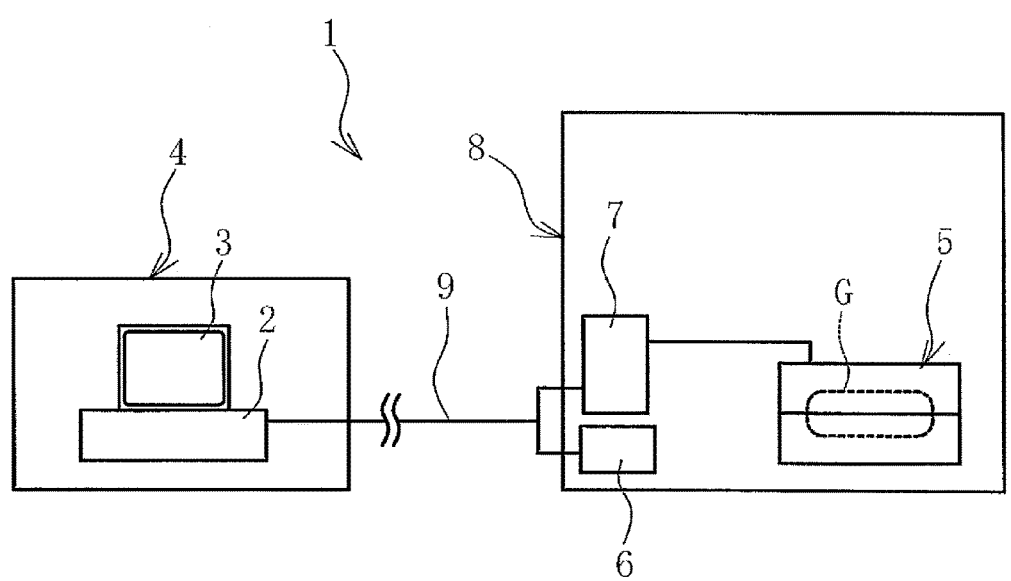
FIG. 1 is an explanatory view illustrating an overall view of a vulcanization control system of the present technology.

Embodiments of a vulcanization control method and a vulcanization control system of the present technology illustrated in the drawings are described below.

A vulcanization control system 1 of the present technology illustrated in FIG. 1 is provided with a computation device 2 and an input device 6 that inputs, into the computation device 2, data Xi of predetermined types of vulcanization-affecting factors X that affect vulcanization time. A vulcanization control device 7 that controls a vulcanization device 5 is connected to the computation device 2. In this embodiment, the computation device 2 is disposed in a central control room 4, along with a monitor 3. Along with the vulcanization device 5, the input device 6 and the vulcanization control device 7 are disposed in a vulcanization plant 8 that is in a different location to the central control room 4. The input device 6 and the vulcanization control device 7 disposed in the vulcanization plant 8, and the computation device 2 disposed in the central control room 4 are connected wirelessly, or in a wired manner using a communication line 9.

The computation device 2 calculates a vulcanization time Tc that includes a safety time Ts set on the basis of the various vulcanization-affecting factors X. A one-dimensional thermal conduction model 10 for a tire cross-section that passes through a vulcanization rate-limiting section of a pneumatic tire T (a green tire G) to be vulcanized is stored in the computation device 2. Further, data to calculate a degree of equivalent vulcanization of unvulcanized rubber (rubber composition), and the like are also stored. Note that the vulcanization rate-limiting section, which is a section where vulcanization is slowest, is generally positioned in the vicinity of a tire center portion, a tire shoulder portion or a tire bead portion and is known for each tire.

Figure 2:
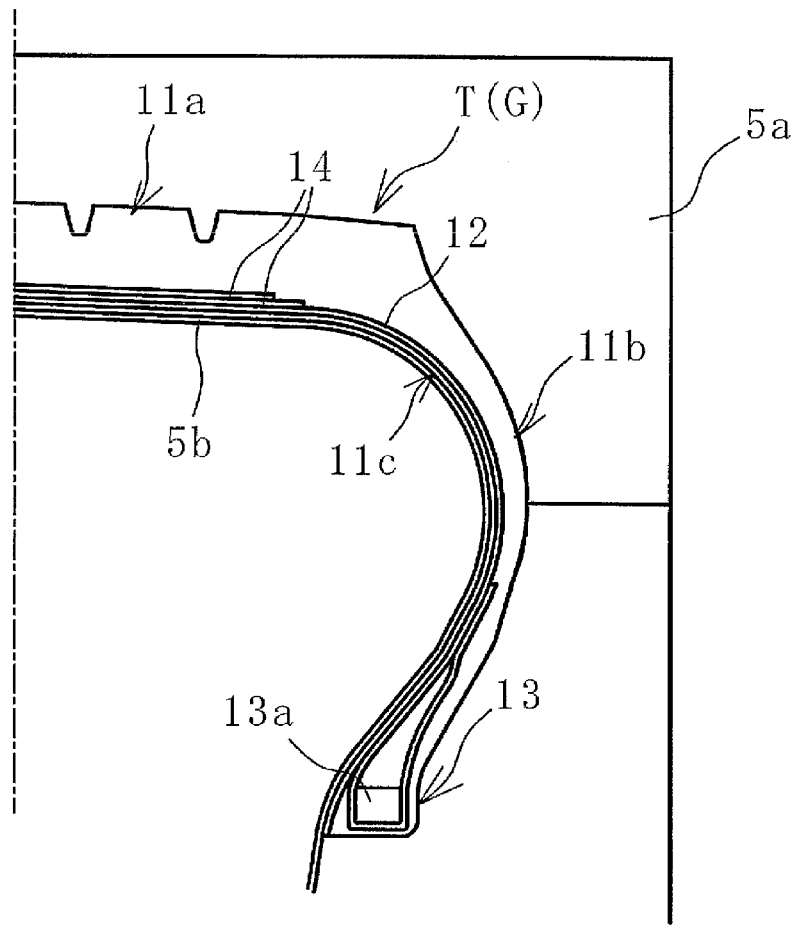
FIG. 2 is a half cross-sectional view taken along a meridian of a tire being vulcanized.

A state in which a pneumatic tire T is vulcanized is illustrated in FIG. 2. The pneumatic tire T is provided with a tread portion 11a extending in the tire circumferential direction in an annular shape, a pair of side wall portions 11b disposed on both sides of the tread portion 11a, and a pair of bead portions 13 disposed on the inner sides of the side wall portions 11b in the tire radial direction. A carcass layer 12 extends between the pair of bead portions 13, and an inner liner 11c is disposed on the inner peripheral side of the carcass layer 12. The carcass layer 12 includes a plurality of reinforcing cords extending in the tire radial direction, and is folded back around a bead core 13a disposed in each of the bead portions 13 from a tire inner side to a tire outer side. A bead filler having a triangular cross-sectional shape formed of a rubber composition is disposed on an outer periphery of the bead core 13a. A plurality of belt layers 14 is embedded on an outer peripheral side of the carcass layer 12 in the tread portion 11a. These belt layers 14 each include a plurality of reinforcing cords that incline with respect to the tire circumferential direction and are disposed with the reinforcing cords of different layers intersecting each other. The tread portion 11a, the sidewall portion 11b, and the inner liner 11c are mainly formed of a rubber composition. The tire interior structure illustrates a typical example of a pneumatic tire, but the present technology is not limited to this example.

The pneumatic tire T is manufactured by vulcanizing the green tire G disposed in the interior of a vulcanization mold 5a that form the vulcanization device 5. At the time of vulcanization, a vulcanization bladder 5b that expands due to a heating medium applies heat while pressing an inner peripheral surface of the green tire G (the inner liner 11c). This causes an outer peripheral surface of the green tire G to be pressed against the vulcanization mold 5a, and heat is applied from the vulcanization mold 5a to the outer peripheral surface of the green tire G. Thus, the section that becomes the vulcanization rate-limiting section (the section where the vulcanization is slowest) is a section positioned furthest from both the outer peripheral surface and the inner peripheral surface of the green tire G.

Figure 3:
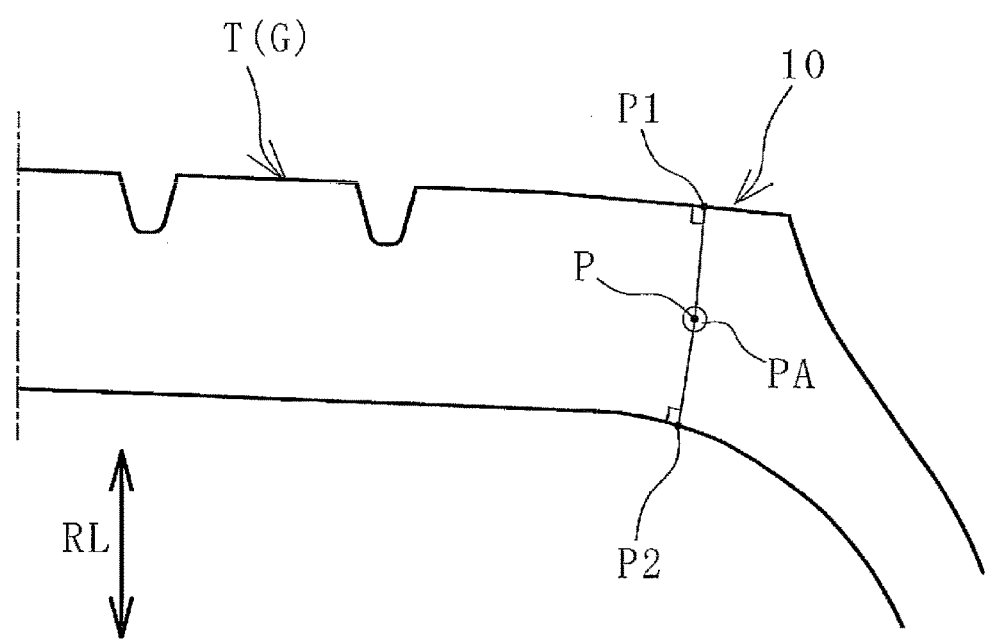
FIG. 3 is an explanatory view for explaining creation of a one-dimensional thermal conduction model for a tire cross-section used in the present technology.

When the pneumatic tire T is vulcanized, in the present technology, the optimum vulcanization time Tc is calculated using the one-dimensional thermal conduction model 10 for the tire cross-section created as illustrated in FIG. 3, and the green tire G is vulcanized using the calculated vulcanization time Tc. In FIG. 3, the tire radial direction is illustrated by an arrow RL.

The one-dimensional thermal conduction model 10 is formed of vertical lines that are respectively drawn from a center P of the vulcanization rate-limiting section on the tire cross-section to the inner peripheral surface and the outer peripheral surface of the tire and are joined with each other, which passes through a vulcanization rate-limiting section PA. The center P of the vulcanization rate-limiting section may be set on the basis of experience, experimentation, or a cross-sectional (two-dimensional) temperature calculation. A reference symbol P1 in FIG. 3 is a tire outer periphery heat source, a reference symbol P2 is a tire inner periphery heat source, and respective temperature boundary conditions are set for the P1 and P2.

When calculating the vulcanization time Tc with the one-dimensional thermal conduction model 10, the boundary conditions and initial conditions are applied, and the change in temperature distribution over time of a one-dimensional cross-section for the tire that passes through the vulcanization rate-limiting section PA are ascertained. Here, the boundary conditions and the initial conditions are applied to the one-dimensional thermal conduction model 10 by inputting the data Xi of the predetermined types of the necessary vulcanization-affecting factors X, using the input device 6. As the predetermined types of the vulcanization-affecting factors X, for example, a temperature of the green tire G before vulcanization, a gage thickness of the vulcanization rate-limiting section of the green tire G, a width and a groove depth of a tire tread pattern corresponding to the vulcanization rate-limiting section, a vulcanization rate and a blow point time of the unvulcanized rubber forming the vulcanization rate-limiting section of the green tire G, a temperature of the vulcanization mold 5a before vulcanization, and a temperature of the vulcanization bladder 5b before vulcanization are used. As the data Xi of the vulcanization-affecting factors X, it is also possible to use data obtained as, for example, control data in each step. This makes it possible to reduce the man-hours to newly obtain the data Xi.

Using the data Xi input through the input device 6, with the one-dimensional thermal conduction model 10, the temperature of the tire cross-section over time is calculated using difference calculus for example, and the change in the temperature distribution over time is calculated. Next, using data of the calculated change in the temperature distribution over time, the Arrhenius reaction rate equation is used to calculate the degree of equivalent vulcanization of the tire cross-section over time, and the change in a vulcanization degree distribution over time is calculated. Next, based on the ascertained data of the change in the vulcanization degree distribution over time, and on the blow point time of the unvulcanized rubber, a blow point time Tb of the green tire G to be vulcanized is calculated. The data of the change in the temperature distribution of the tire cross-section over time, the change in the vulcanization degree distribution over time, and the like can be displayed on the monitor 3 and verified.

In the vulcanization time Tc that is set when the vulcanization is performed, the safety time Ts set on the basis of representative values of the various vulcanization-affecting factors X (Ts=ΣTsi) is added to the calculated blow point time Tb. In other words, the vulcanization time Tc=Tb+Ts. In the present technology, when the vulcanization time Tc is calculated, of the safety time Ts, a safety time Tsi that is set on the basis of only the data Xi of the individual vulcanization-affecting factors X input through the input device 6 is subtracted. In other words, the data Xi of the vulcanization-affecting factors X input through the input device 6 are already taken into account when calculating the blow point time Tb, and thus the safety time Tsi set on the basis of only the vulcanization-affecting factors X is not needed. Therefore, the unnecessary safety time Tsi is subtracted from the reference safety time Ts. In this way, when the green tire G is vulcanized, the set vulcanization time Tc is shortened.

The calculated vulcanization time Tc is input to the vulcanization control device 7 via the communication line 9. The vulcanization control device 7 controls the vulcanization device 5 to vulcanize the green tire G for the vulcanization time Tc.

The heat applied to the green tire G by the vulcanization is only conducted from the high temperature sections to the low temperature sections, and rather than an instant quantity of heat, the accumulation of the chemical reaction based on the applied quantity of heat has a large impact on the vulcanization time. Therefore, even without using a complex analysis model, such as a three-dimensional model, it is possible to accurately calculate the optimum vulcanization time Tc using the one-dimensional thermal conduction model 10. Therefore, even while using the simple one-dimensional thermal conduction model 10, the vulcanization time can be shortened while preventing insufficient vulcanization.

Further, as the one-dimensional thermal conduction model 10 is used as the analysis model, complex and numerous calculations become unnecessary, and a calculation time is significantly shortened. In this way, the optimum vulcanization time Tc can be obtained instantly using the computation device 2. It is also possible to reduce the man-hours required to create the analysis model.

For example, the present technology is applied to each lot of tires to be vulcanized having the same specification, and the optimum vulcanization time Tc is calculated. Alternatively, the present technology can also be applied to each individual tire to be vulcanized.

When calculations are performed using the one-dimensional thermal conduction model 10, as the data Xi of the vulcanization-affecting factors X input into the computation device 2, the temperature of the vulcanization mold 5a before vulcanization, the temperature of the vulcanization bladder 5b before vulcanization, and the temperature of the green tire G before vulcanization are used, for example. The temperature of the vulcanization mold 5a before vulcanization is reflected in the boundary conditions on one side in the tire radial direction RL of the one-dimensional thermal conduction model 10. The temperature of the vulcanization bladder 5b before vulcanization is reflected in the boundary conditions on the other side in the tire radial direction RL of the one-dimensional thermal conduction model 10. The temperature of the green tire G before vulcanization is reflected in the initial conditions. In this way, the change in the temperature distribution over time, the change in the vulcanization degree distribution over time, and therefore the optimum vulcanization time Tc are easily and accurately calculated.

As the data Xi of the vulcanization-affecting factors X input into the computation device 2, the gage thickness of the vulcanization rate-limiting section (also including the vicinity of the vulcanization rate-limiting section) of the green tire G, and the vulcanization rate of the unvulcanized rubber forming the vulcanization rate-limiting section of the green tire G can be also used. In this case, the gage thickness of the vulcanization rate-limiting section of the green tire G is reflected in a length between both ends of the one-dimensional thermal conduction model 10 (a length of the tire radial direction RL, for example). The vulcanization rate of the unvulcanized rubber forming the vulcanization rate-limiting section of the green tire G is reflected in a reference for reaching the degree of equivalent vulcanization when calculating the vulcanization time on the basis of the change in the temperature distribution of the tire cross-section over time. Specifically, the vulcanization rate is reflected in a reference for calculating the degree of equivalent vulcanization, and is set such that the degree of equivalent vulcanization of the unvulcanized rubber, for which the vulcanization rate is slow, does not rise if a higher temperature is not reached. In this way, the change in the temperature distribution over time, the change in the vulcanization degree distribution over time, and therefore the optimum vulcanization time Tc are easily and accurately calculated.

In order to ascertain the change in the temperature distribution in the tire cross-section over time with a high degree of accuracy using the one-dimensional thermal conduction model 10, as the data Xi of the vulcanization-affecting factors X input into the computation device 2, it is preferable that at least the temperature of the green tire G before vulcanization, the gage thickness of the vulcanization rate-limiting section of the green tire G, the width and the groove depth of the tire tread pattern corresponding to the vulcanization rate-limiting section, the vulcanization rate and the blow point time of the unvulcanized rubber forming the vulcanization rate-limiting section of the green tire G, the temperature of the vulcanization mold 5a before vulcanization, and the temperature of the vulcanization bladder 5b before vulcanization be used.

It should be noted that metal members of, for example, the belt layers 14, and the bead cores 13a that form the green tire G have excellent thermal conductivity in comparison to the rubber composition. Further, depending on the tire tread pattern, there are cases in which the thermal conductivity is significantly increased. Here, depending on the metal members or the tire tread pattern, in the one-dimensional thermal conduction model 10 in actual tire size, there are cases in which it is not possible to obtain conformity with the thermal conductivity of the actual green tire G. In this type of case, a magnitude of the impact of the metal members or the tire tread pattern on the thermal conductivity is ascertained in advance and, on the basis of the magnitude of the impact, the length in the radial direction RL of the one-dimensional thermal conduction model 10 is adjusted to conform to the actually measured thermal conduction. In this way, it is possible to obtain a simple analysis model without losing accuracy of the calculation results.

As in the above-described embodiment, when the input device 6 is disposed in the vulcanization plant 8 in which the green tire G is vulcanized, and the computation device 2 is disposed in a location different to the vulcanization plant 8, it is possible to control vulcanization information in a centralized manner at the location at which the computation device 2 is disposed (the central control room 4), and thus the vulcanization information is easily managed. For example, the computation device 2 disposed in the central control room 4 is caused to be a hub, and the computation device 2 is connected, via the communication lines 9, to a plurality of the input devices 6 disposed in the respective vulcanization plants 8. The computation device 2 and the input device 6 need not necessarily be disposed within the same country. The computation device 2 that is disposed in a country is connected to the input device 6 disposed in another country via the communication line 9 when the vulcanization plant 8 is in another country.

What is claimed is:

1. A vulcanization control method of calculating a vulcanization time including a safety time set based on vulcanization-affecting factors that affect the vulcanization time and vulcanizing a green tire for the calculated vulcanization time, the method comprising the steps of:
   inputting data of predetermined types of vulcanization-affecting factors into a computation device before vulcanizing a green tire;
   calculating, by the computation device that uses the input data, a change in temperature distribution of a tire cross section over time with a one-dimensional thermal conduction model for a tire cross section that passes through a vulcanization rate-limiting section of the green tire, wherein the one-dimensional thermal conduction model is formed of vertical lines that are respectively drawn from a center of the vulcanization rate-limiting section on the tire cross-section to an inner peripheral surface and an outer peripheral surface of the green tire and are joined with each other, the vertical lines passing through the vulcanization rate-limiting section;
   calculating a vulcanization time based on a result of the calculating the change in temperature distribution;
   shortening the safety time set based on the input data of individual vulcanization-affecting factors; and
   vulcanizing the green tire using the safety time, shortened based on the input data, by using a heating medium to cause a vulcanization bladder to expand and press against the inner peripheral surface of the green tire, causing the outer peripheral surface of the green tire to be pressed against the vulcanization mold, wherein heat is applied from the vulcanization mold to the outer peripheral surface of the green tire.

2. The vulcanization control method according to claim 1, wherein a temperature of a vulcanization mold before vulcanization, a temperature of a vulcanization bladder before vulcanization, and a temperature of the green tire before vulcanization are used as the data of the vulcanization-affecting factors that is input into the computation device,
   each of the temperature of the vulcanization mold before vulcanization and the temperature of the vulcanization bladder before vulcanization are reflected in boundary conditions of a tire radial direction of the one-dimensional thermal conduction model, and
   the temperature of the green tire before vulcanization is reflected in initial conditions of the one-dimensional thermal conduction model.

3. The vulcanization control method according to claim 1, wherein at least the temperature of the green tire before vulcanization, a gage thickness of the vulcanization rate-limiting section of the green tire, a width and a groove depth of a tire tread pattern corresponding to the vulcanization rate-limiting section, a vulcanization rate and a blow point time of unvulcanized rubber forming the vulcanization rate-limiting section of the green tire, a temperature of a vulcanization mold before vulcanization, and a temperature of a vulcanization bladder before vulcanization are used as the data of the vulcanization-affecting factors that is input into the computation device,
   the gage thickness of the vulcanization rate-limiting section of the green tire is reflected in a length between both ends of the one-dimensional thermal conduction model, and
   the vulcanization rate of the unvulcanized rubber forming the vulcanization rate-limiting section of the green tire is reflected in a reference for reaching a degree of equivalent vulcanization upon calculating the vulcanization time based on the change in the temperature distribution of the tire cross section over time.

4. The vulcanization control method according to claim 1, wherein, based on a magnitude of an impact on thermal conductivity of metal members forming the green tire or of a tire tread pattern, a length in a tire radial direction of the one-dimensional thermal conduction model is adjusted to conform to an actually measured thermal conduction.

5. The vulcanization control method according to claim 1, wherein an input device that inputs the data of the vulcanization-affecting factors is installed in a plant for vulcanizing the green tire, and the computation device is installed in a location different to the plant.

6. The vulcanization control method according to claim 2, wherein at least the temperature of the green tire before vulcanization, a gage thickness of the vulcanization rate-limiting section of the green tire, a width and a groove depth of a tire tread pattern corresponding to the vulcanization rate-limiting section, a vulcanization rate and a blow point time of unvulcanized rubber forming the vulcanization rate-limiting section of the green tire, a temperature of a vulcanization mold before vulcanization, and a temperature of a vulcanization bladder before vulcanization are used as the data of the vulcanization-affecting factors that is input into the computation device, the gage thickness of the vulcanization rate-limiting section of the green tire is reflected in a length between both ends of the one-dimensional thermal conduction model, and the vulcanization rate of the unvulcanized rubber forming the vulcanization rate-limiting section of the green tire is reflected in a reference for reaching a degree of equivalent vulcanization upon calculating the vulcanization time based on the change in the temperature distribution of the tire cross section over time.

7. The vulcanization control method according to claim 6, wherein, based on a magnitude of an impact on thermal conductivity of metal members forming the green tire or of a tire tread pattern, a length in a tire radial direction of the one-dimensional thermal conduction model is adjusted to conform to an actually measured thermal conduction.

8. The vulcanization control method according to claim 7, wherein an input device that inputs the data of the vulcanization-affecting factors is installed in a plant for vulcanizing the green tire, and the computation device is installed in a location different to the plant.

9. The vulcanization control method according to claim 4, wherein an input device that inputs the data of the vulcanization-affecting factors is installed in a plant for vulcanizing the green tire, and the computation device is installed in a location different to the plant.

10. The vulcanization control method according to claim 3, wherein, based on a magnitude of an impact on thermal conductivity of metal members forming the green tire or of a tire tread pattern, a length in a tire radial direction of the one-dimensional thermal conduction model is adjusted to conform to an actually measured thermal conduction.

11. The vulcanization control method according to claim 10, wherein an input device that inputs the data of the vulcanization-affecting factors is installed in a plant for vulcanizing the green tire, and the computation device is installed in a location different to the plant.

12. The vulcanization control method according to claim 3, wherein an input device that inputs the data of the vulcanization-affecting factors is installed in a plant for vulcanizing the green tire, and the computation device is installed in a location different to the plant.

13. The vulcanization control method according to claim 2, wherein, based on a magnitude of an impact on thermal conductivity of metal members forming the green tire or of a tire tread pattern, a length in a tire radial direction of the one-dimensional thermal conduction model is adjusted to conform to an actually measured thermal conduction.

14. The vulcanization control method according to claim 13, wherein an input device that inputs the data of the vulcanization-affecting factors is installed in a plant for vulcanizing the green tire, and the computation device is installed in a location different to the plant.

15. The vulcanization control method according to claim 2, wherein an input device that inputs the data of the vulcanization-affecting factors is installed in a plant for vulcanizing the green tire, and the computation device is installed in a location different to the plant.

16. A vulcanization control system provided with a computation device that calculates a vulcanization time, the vulcanization time including a safety time set based on vulcanization-affecting factors that affect the vulcanization time, and the vulcanization control system vulcanizing a green tire for the calculated vulcanization time, wherein a one-dimensional thermal conduction model for a tire cross section that passes through a vulcanization rate-limiting section of a green tire to be vulcanized is stored in the computation device, wherein the one-dimensional thermal conduction model is formed of vertical lines that are respectively drawn from a center of the vulcanization rate-limiting section on the tire cross-section to an inner peripheral surface and an outer peripheral surface of the green tire and are joined with each other, the vertical lines passing through the vulcanization rate-limiting section, an input device is provided that inputs data of predetermined types of vulcanization-affecting factors into the computation device before vulcanizing the green tire, the computation device uses input data input by the input device to calculate a change in temperature distribution of a tire cross section over time with the one-dimensional thermal conduction model and to calculate a vulcanization time based on results of calculating the change in temperature distribution, and upon calculating the vulcanization time, the computation device shortens the safety time set based on each vulcanization-affecting factor, based on the data of individual vulcanization-affecting factors input by the input device, the vulcanization control system vulcanizing the green tire using the safety time by using a heating medium to cause a vulcanization bladder to expand and press against the inner peripheral surface of the green tire, causing the outer peripheral surface of the green tire to be pressed against the vulcanization mold, wherein heat is applied from the vulcanization mold to the outer peripheral surface of the green tire.

17. The vulcanization control system according to claim 16, wherein the data of the vulcanization-affecting factors that is input into the computation device includes at least a temperature of the green tire before vulcanization, a gage thickness of the vulcanization rate-limiting section of the green tire, a tire tread pattern width and a groove depth of a tire corresponding to the vulcanization rate-limiting section, a vulcanization rate and a blow point time of unvulcanized rubber forming the vulcanization rate-limiting section of the green tire, a temperature of a vulcanization mold before vulcanization, and a temperature of a vulcanization bladder before vulcanization.

18. The vulcanization control system according to claim 16, wherein the input device is installed in a plant for vulcanizing the green tire, and the computation device is installed in a location different to the plant.

19. The vulcanization control system according to claim 17, wherein the input device is installed in a plant for vulcanizing the green tire, and the computation device is installed in a location different to the plant.

\* \* \* \* \*